Figure 1:
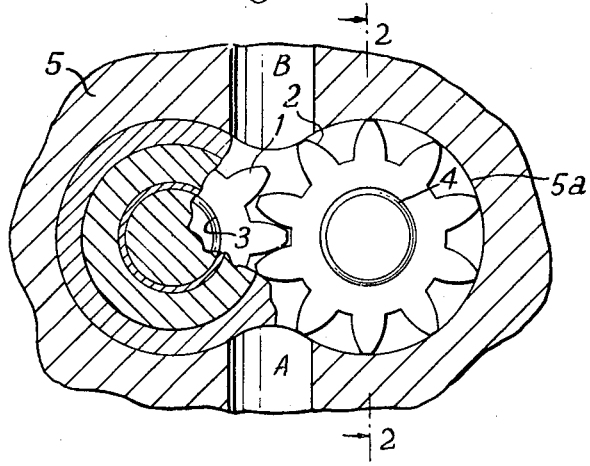

Feb. 19, 1963  R. S. WOOD  3,077,840
ROTARY DISPLACEMENT PUMPS
Filed July 25, 1961

United States Patent Office 3,077,840
Patented Feb. 19, 1963

3,077,840
ROTARY DISPLACEMENT PUMPS
Robert Spurgeon Wood, Chadwell Heath, Romford, England, assignor to The Plessey Company Limited, London, England, a British company
Filed July 25, 1961, Ser. No. 128,928
Claims priority, application Great Britain Aug. 2, 1960
7 Claims. (Cl. 103—126)

This invention relates to gear pumps and other rotary displacement pumps of the kind in which the operation of a rotor or of rotors produces a pressure gradient round at least part of the circumference of a rotor that operates between end members which contain the rotor shaft bearings and are required to be in sealing contact with the ends of the rotor so as to counteract short-circuit of pressure across the end surfaces.

The end surfaces may be provided by the bearing members, which may be fixed or movable in the pump housing, or the pump may, for example, have axially movable side plates to which pressure loading is intended to be applied through bearing housings supported against the side plates.

The invention has for an object to provide improved pumps of the kind specified which maintain a high volumetric efficiency within a wide range of operating temperatures. In the case of displacement pumps in which the rotors run between side members fixed in the housing it is well known that difficulties arise, when the pumps are required to operate in a wide range of temperatures, as regards the requirement of maintaining, especially at high pressure, an effective seal at the end surfaces of the rotors at high temperatures while avoiding jamming at low temperatures. It has therefore already been proposed to provide the side surfaces on members which are axially movable in the housing and are urged by pressure loading into contact with the rotor end surfaces, these movable elements being integral with, or containing, the shaft bearings for the rotor or rotors, or being arranged to move jointly with the shaft bearings. While in such pumps an effective seal could be maintained over a wide pressure range when working at moderate temperatures near room temperature, it was found that, in spite of the pressure loading facilities provided, the efficiency of the pumps showed an unexpected decline when the pumps were required to work at higher temperatures, and the present invention has for a more specific object to reduce this decline in volumetric efficiency.

The invention is based on the discovery that in pumps of the kind specified the radial load on the bearing bushes or bearing housings and the friction force resulting from this load is so great that if a gap causing leakage develops between the rotor end surface and the co-operating surface of the bearing bush or end plate, the resulting pressure force difference between the outer and inner sides of the movable body is insufficient to move the latter again into sealing contact with the rotor end faces; on the contrary, since in practice the expansion co-efficient of the pump housing is in many cases substantially greater than that of the rotor or rotors, the bearing bushes or other end sealing members tend to move away from the rotor end faces, as the pump warms up, thus creating a gap which, for the above mentioned reasons, will remain in existence as long as the pump operates and as therefore the radial bearing load, due to the pressure distribution round the rotor or rotors, is maintained.

Based on this discovery the present invention proposes to make the bearing bush or bearing housing of a material having a co-efficient of thermal expansion which is so much greater than that of the pump housing that, with the centre of the bearing bush or housing remaining fixed in the pump housing, the sealing surface of the said bushes or housings will remain in contact with the rotor or rotors irrespective of variations of temperature within the required range.

We have further appreciated that in the case of gear pumps and other pumps having rigid rotors the seal of a pump of the kind specified working within a wide temperature range is also affected by differences in the radial expansion of the rotor or rotors and the bearings or bearing housings, since when at room temperature the rotor circumference is held by the reaction forces in sealing contact with the peripheral surface of the housing in the material zone adjacent the low-pressure side, radial expansion of the bearings or bearing housings will at higher temperatures lift the gears or other rotors out of contact with the peripheral wall, thus causing a leakage flow between the tips of the gears or equivalent elements and the inner circumference of the pump housing. The losses in output resulting from this phenomenon can, according to a feature of the invention, be reduced if the bearings are arranged in housings the material of which is so chosen that its total radial expansion with heat is substantially equal to the radial expansion of the gears or the like.

In a pump according to the first-mentioned feature of the present invention the part of the bearing housing which is in contact with the pump housing is required to consist of a material having a co-efficient of thermal expansion which is greater than that of the pump housing, which itself has a co-efficient of thermal expansion greater than that of the gears or the like. Equality of the total radial expansion can nevertheless be achieved, according to a feature of the present invention, by making this outer part of the bearing housing relatively small in thickness, within the limits set by the requirements of mechanical strength, and to interpose between this part and the bearing bush proper—which latter is made of a thin-wall construction, and the material of which is chosen for its low friction and other mechanical properties, a body portion of a material having such a low co-efficient of thermal expansion between room temperature and the required working temperature of the pump that the total radial expansion of the aggregate body is substantially equal to the total radial expansion of the rotor body.

It is immaterial for the purpose of the invention that due to the use of material of different co-efficients of expansion the gap between the low-expansion intermediate body and the high-expansion outer shell of the housings will increase, because as mentioned above, the reaction forces will always urge the bearings towards the low-pressure side of the housing, thus closing the gap at the side at which the circumference of the bearing housings and the gears are required to seal against the pump housing.

Figure 2:
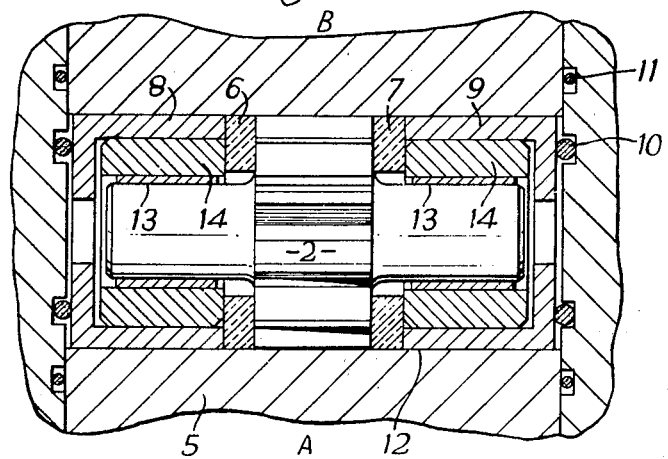

In order to facilitate understanding of the invention an embodiment of the invention will now be described in more detail with reference to the drawings accompanying the specification, in which FIGURE 1 is a sectional elevation of part of the elements accommodated in the working chamber of a gear pump incorporating the present invention, and FIGURE 2 is a horizontal section on line 2—2 of FIGURE 1.

Referring now to the drawings, co-operating pump gears 1, 2 are respectively arranged on shafts 3 and 4 in a common cavity 5a of the pump housing 5 which also contains, facing respectively the two end faces of the gears, a pair of so-called side plates 6 and 7 and, in contact with the outer faces of the latter, bearing housing plates 8 and 9, in which the journals of the shafts 3 and 4 are supported. This whole assembly is free to move axially for a small distance in the housing cavity 5a, sealing contact between the end faces of the gears 1 and 2 and the side plates 6 and 7 being normally ensured in a well-known manner by admitting pump delivery pressure to chambers at the outer sides of the bearing housing members 8, 9 defined by inner and outer O-ring seals 10 and 11.

When the pump operates, the pressures in the tooth gaps at the delivery side A of the pump is approximately equal to pump delivery pressure, whereas on at least part of the low-pressure side B the pressure in the tooth gaps is equal to the pump inlet pressure (if the pump operates as a motor, A would be the high-pressure inlet side and B would be the low-pressure outlet side). Therefore if there is any clearance between the bearing housings 8, 9 and the pump housing 5, the resultant force exerted by the pressure round the gears forces the bearing housing 8 and 9 into contact with the pump housing 5 at the low-pressure side B, leaving a gap 12 at the high-pressure side A. This feature is, according to a now well-known practice, utilised for ensuring good sealing contact between the gears 1 and 2 and the housing 5 at the low-pressure side by choosing a gear having slightly larger diameter than the gear housing so that, when the gear housings are urged to the illustrated position under the action of the pressure forces, the gears wear into the body of the housing 5, with which they thus establish gapless contact at the low-pressure side B when sufficient wear has taken place to allow the bearing housings 8 and 9 to become supported on the surface of the wall in the pump housing 5.

According to the invention the bearings proper are constituted by thin-walled sleeves 13, and the peripheral wall of the bearing housing 8 and 9 is reduced in thickness, within the limit ensuring adequate mechanical strength, so as to leave between the bearing sleeves 13 and the wall of the bearing housings 8 and 9 a considerable radial clearance, which accommodates a filler sleeve 14. The body of the pump housing 5 may consist of low-expansion aluminium alloy, the bearing sleeves 13 may be of bronze and the gears of steel.

According to a feature of the invention, the bearing housings 8 and 9 are made of material having a higher coefficient of thermal expansion than the body 5 of the pump housing, for example of a high-expansion aluminium alloy, which is so chosen that, when the bearing housing is held fixed in the pump housing body 5 at the middle of its length, the inward expansion of the bearing housing towards the side plates 6 and 7 exceeds the thermal expansion in the opposite direction of the corresponding part of the pump housing by the same amount by which the thermal expansion of the part of the pump housing between the centre plane of the gears and the outer surface of the side plates exceeds the total expansion of the corresponding parts of the latter. As a result of this, no gap will be created, by the thermal expansion of the parts, between the end faces of the gears 1 and 2 and the inner surfaces of the side plates 6 and 7. The filler body 14 on the other hand is made of a material having very low thermal expansion, for example of the 36% nickel-steel alloy known as Invar, and its radial thickness is so determined in relation to the thermal expansion co-efficients of the various parts concerned that the total thermal expansion in radial thickness of the bearing sleeves 13, the outer wall of the bearing housings 8 and 9, and the filler body 14 equals the total radial expansion of the gear between the shaft and the gear tips. If the bearing housings were made of solid bronze, according to the usual custom, their greater radial thermal expansion compared with that of the gear would force the tips of the gear tooth away from the wall of the pump housing body 5, thus destroying at high temperatures the fluid-tight seal which has been produced by the radial wearing-in process.

It will be appreciated by those skilled in the art that the invention is not limited to all the details of the embodiment described, and that more particularly the specific materials chosen in the illustrated embodiment may be replaced by other materials having appropriately chosen relationship of their thermal expansion co-efficients.

What I claim is:

1. A rotary displacement machine comprising a housing containing an operating chamber having a peripheral wall surface, a high-pressure port, and low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and at least one journal projecting from such end face, said operating chamber including at least one cylindrical portion through which such journal extends, a bearing assembly for each such journal, each bearing assembly including an outer bush of a material having a coefficient of thermal expansion which is greater than that of said housing, said outer bush fitting sealingly into such cylindrical portion of the cavity for sliding movement towards and away from such rotor, a thin-wall bearing sleeve of a material having a coefficient of thermal expansion greater than that of the outer bush, said sleeve being fitted round said journal and being accommodated inside the outer bush, the inside diameter of said outer bush from its end facing the rotor throughout at least part of its length accommodating the bearing sleeve being so much greater than the outside diameter of the sleeve as to leave round said sleeve a radial gap of a width greater than the radial thickness of said sleeve, and a filler sleeve of low-expansion material slidably fitting into the outer bush and over the bearing sleeve to fill the gap, passage means being provided in the machine to connect the high-pressure port with a point of the operating chamber separated from the rotor end face by the bearing assembly for causing pressure from said port to urge the assembly into sealing contact with said end face, the coefficient of thermal expansion of the outer bush being so chosen that for any given temperature difference the thermal expansion of the housing between the axially fixed point of the rotor axis and the centre of the bush is equal to the sum of the axial expansions of the included part of the axial length of the rotor, and half the length of the bush, and the radial thickness of the gap between the sleeve and the bush being such that the total amount of thermal expansion per unit of temperature of the bearing assembly is equal to that of the rotor.

2. A rotary displacement machine comprising a housing containing an operating chamber having a peripheral wall surface in the form of a geometrical cylinder, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and at least one journal projecting from such end face, inside the operating chamber, a bearing assembly for each such journal, each bearing assembly including an outer bush of a material having a coefficient of thermal expansion which is greater than that of said housing, said outer bush fitting sealingly into such cylindrical cavity for sliding movement towards and away from such rotor, a thin-wall bearing sleeve of a material having a coefficient of thermal expansion greater than that of the outer bush, said sleeve being fitted round said journal and being accommodated inside the outer bush, the inside diameter of said outer bush from its end facing the rotor throughout at least part of its length accommodating the bearing sleeve being so much greater than the outside diameter of the sleeve as to leave round said sleeve a radial gap of a width greater than the radial thickness of said sleeve, and a filler sleeve of low-expansion material slidably fitting into the outer bush and over the bearing sleeve to fill the gap, passage means being provided in the machine to connect the high-pressure port with a point of the operating chamber separated from the rotor end face by the bearing assembly for causing pressure from said port to urge the assembly into sealing contact with said end face, the coefficient of thermal expansion of the outer bush being so chosen that for any given temperature difference the thermal expansion of the housing between the axially fixed point of the rotor axis and the centre of the bush is equal to the sum of the axial expansions of the included part of the axial length of the rotor, and half the length of the bush, and the radial thickness of the gap between the sleeve and the bush being such that the total amount of thermal expansion per unit of temperature of the bearing assembly is equal to that of the rotor.

3. A rotary displacement machine comprising a housing containing an operating chamber having a peripheral wall surface, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and at least one journal projecting from such end face, said operating chamber including at least one cylindrical portion through which such journal extends, a bearing for each such journal, made of a material having a coefficient of thermal expansion which is greater than that of said housing, said bearing fitting sealingly into such cylindrical portion of the cavity for sliding movement towards and away from such rotor, passage means being provided in the machine to connect the high-pressure port with a point of the operating chamber separated from the rotor end face by the bearing for causing pressure from said port to urge the assembly into sealing contact with said end face, the coefficient of thermal expansion of the bearing being so chosen that for any given temperature difference the thermal expansion of the housing between the axially fixed point of the rotor axis and the centre of the bearing is equal to the sum of the axial expansions of the included part of the axial length of the rotor and half the length of the bearing.

4. A rotary displacement machine comprising a housing containing an operating chamber having a peripheral wall surface in the form of a geometrical cylinder, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and at least one journal projecting from such end face inside said operating chamber, a bearing assembly for each such journal, each bearing assembly including an outer bush of a material having a coefficient of thermal expansion which is greater than that of said housing, said outer bush fitting sealingly into such cylindrical cavity for sliding movement towards and away from such rotor, a thin wall bearing sleeve of a material having a coefficient of thermal expansion greater than that of the outer bush, said sleeve being fitted round said journal and being accommodated inside the outer bush, the inside diameter of said outer bush from its end facing the rotor throughout at least part of its length accommodating the bearing sleeve being so much greater than the outside diameter of the sleeve as to leave round said sleeve a radial gap of a width greater than the radial thickness of said sleeve, a filler sleeve of low-expansion material slidably fitting into the outer bush and over the bearing sleeve to fill the gap, and a pressure plate interposed between said bush and the adjacent end face of the rotor in sealing contact with the rotor end face, passage means being provided in the machine to connect the high-pressure port with a point of the operating chamber separated from the rotor end face by the bearing assembly for causing pressure from said port to urge the assembly into sealing contact with said end face, the ratio of the composite coefficient of thermal expansion of the outer bush and end plate to that of the housing being approximately equal to the ratio of the coefficient of thermal expansion of the housing to that of the rotor multiplied by the ratio of half the axial length of the rotor to the sum of the thickness of the end plate and half the axial length of the bush, and the radial thickness of the gap between the sleeve and the bush being such that the total amount of thermal expansion per unit of temperature of the bearing assembly is equal to that of the rotor.

5. A rotary displacement machine comprising a housing containing an operating chamber having a peripheral wall surface, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and at least one journal projecting from such end face, said operating chamber including at least one cylindrical portion through which such journal extends, a bearing for each such journal, made of a material having a coefficient of thermal expansion which is greater than that of said housing, said bearing fitting sealingly into such cylindrical portion of the cavity for sliding movement towards and away from such rotor, and a pressure plate interposed between said bearing and the adjacent end face of the rotor, passage means being provided in the machine to connect the high-pressure port with a point of the operating chamber separated from the rotor end face by the bearing for causing pressure from said port to urge the assembly into sealing contact with said end face, the coefficients of thermal expansion of the bearing and end plate being so chosen that for any given temperature difference the thermal expansion of the housing between the axially fixed point of the rotor axis and the centre of the bearing is equal to the sum of the axial expansions of the included part of the axial length of the rotor, the thickness of the pressure plate, and half the length of the bearing.

6. A rotary displacement machine comprising a housing containing an operating chamber having a peripheral wall surface, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and two journals, one projecting from each end face, said operating chamber including cylindrical portions through which such journals extend, a bearing assembly for each such journal, each bearing assembly including an outer bush of a material having a coefficient of thermal expansion which is greater than that of said housing, said outer bush fitting sealingly into such cylindrical portion of the cavity for sliding movement towards and away from such rotor, a thin-wall bearing sleeve of a material having a coefficient of thermal expansion greater than that of the outer bush, said sleeve being fitted round said journal and being accommodated inside the outer bush, the inside diameter of said outer bush from its end facing the rotor throughout at least part of its length accommodating the bearing sleeve being so much greater than the outside diameter of the sleeve as to leave round said sleeve a radial gap of a width greater than the radial thickness of said sleeve, and a filler sleeve of low-expansion material slidably fitting into the outer bush and over the bearing sleeve to fill the gap, passage means being provided in the machine to connect the high-pressure port with a point of the operating chamber separated from the rotor end face by the bearing assembly for causing pressure from said port to urge the assembly into sealing contact with said end face, the coefficient of thermal expansion of the outer bush being so chosen that that for any given temperature difference the thermal expansion of the housing between the centre of the rotor and the centre of the bush is equal to the sum of the axial expansions of half the length of the rotor and half the length of the bush, and the radial thickness of the gap between the sleeve and the bush being such that the total amount of thermal expansion per unit of temperature of the bearing assembly is equal to that of the rotor.

7. A rotary displacement machine comprising a housing containing an operating chamber having a peripheral wall surface, a high-pressure port, and a low-pressure port, at least one displacement rotor mounted in said housing for rotation in said chamber and made of a material having a lower coefficient of thermal expansion than said housing, partition means associated with each rotor and co-operating with at least part of said wall surface to form mutually sealed compartments which during rotation of such rotor convey liquid from one of said ports to the other, each rotor having end faces and two journals, one projecting from each end face, said operating chamber including cylindrical portions through which such journals extend, a bearing assembly for each such journal, each bearing assembly including an outer bush of a material having a coefficient of thermal expansion which is greater than that of said housing, said outer bush fitting sealingly into such cylindrical portion of the cavity for sliding movement towards and away from such rotor, a thin-wall bearing sleeve of a material having a coefficient of thermal expansion greater than that of the outer bush, said sleeve being fitted round said journal and being accommodated inside the outer bush, the inside diameter of said outer bush from its end facing the rotor throughout at least part of its length accommodating the bearing sleeve being so much greater than the outside diameter of the sleeve as to leave round said sleeve a radial gap of a width greater than the radial thickness of said sleeve, and a filler sleeve of low-expansion material slidably fitting into the outer bush and over the bearing sleeve to fill the gap and a pressure plate interposed between said bush and the rotor, passage means being provided in the machine to connect the high-pressure port with a point of the operating chamber separated from the rotor end face by the bearing assembly for causing pressure from said port to urge the assembly into sealing contact with said end face, the coefficient of thermal expansion of the outer bush being so chosen that for any given temperature difference the thermal expansion of the housing between the centre of the rotor and the centre of the bush is equal to the sum of the axial expansions of half the length of the rotor, the thickness of the end plate, and half the length of the bush, and the radial thickness of the gap between the sleeve and the bush being such that the total amount of thermal expansion per unit of temperature of the bearing assembly is equal to that of the rotor.

References Cited in the file of this patent

UNITED STATES PATENTS

| | | |
|---|---|---|
| 1,304,993 | Leonard | May 27, 1919 |
| 2,345,975 | Herman | Apr. 4, 1944 |
| 2,619,040 | Maisch | Nov. 25, 1952 |
| 2,662,483 | Smith et al. | Dec. 15, 1953 |
| 2,696,172 | Compton | Dec. 7, 1954 |
| 2,746,394 | Dolza et al. | May 22, 1956 |
| 2,955,536 | Gaubatz | Oct. 11, 1960 |
| 2,965,040 | Eisenberg | Dec. 20, 1960 |
| 2,966,860 | Maynard | Jan. 3, 1961 |

FOREIGN PATENTS

| | | |
|---|---|---|
| 504,059 | Great Britain | Apr. 19, 1939 |
| 525,761 | Great Britain | Sept. 4, 1940 |